: US 9,252,901 B2
(45) Date of Patent: Feb. 2, 2016

(12) United States Patent
Lee et al.

(54) METHOD AND APPARATUS FOR MANAGING SYNCHRONIZATION GROUPS IN WIRELESS COMMUNICATION SYSTEM

(71) Applicant: Electronics and Telecommunications Research Institute, Daejeon (KR)

(72) Inventors: Anseok Lee, Daejeon (KR); Wooram Shin, Daejeon (KR); Jihyung Kim, Daejeon (KR); Hyun-jae Kim, Incheon (KR); Kwang Jae Lim, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 145 days.

(21) Appl. No.: 14/099,192

(22) Filed: Dec. 6, 2013

(65) Prior Publication Data
US 2014/0293828 A1    Oct. 2, 2014

(30) Foreign Application Priority Data
Mar. 27, 2013   (KR) .......................... 10-2013-0033048

(51) Int. Cl.
*H04J 3/06*    (2006.01)
*H04W 4/00*    (2009.01)
*H04W 56/00*   (2009.01)

(52) U.S. Cl.
CPC ........... *H04J 3/0652* (2013.01); *H04W 56/002* (2013.01)

(58) Field of Classification Search
None
See application file for complete search history.

(56) References Cited

U.S. PATENT DOCUMENTS

| | | | |
|---|---|---|---|
| 8,014,378 B1* | 9/2011 | Yoon et al. ..................... 370/350 |
| 2006/0268705 A1* | 11/2006 | Kurobe et al. ................ 370/230 |
| 2009/0147768 A1* | 6/2009 | Ji et al. ........................... 370/350 |
| 2013/0229959 A1* | 9/2013 | Ghosh et al. .................. 370/311 |
| 2013/0265933 A1* | 10/2013 | Powell, III et al. ........... 370/315 |
| 2014/0269263 A1* | 9/2014 | Zeng et al. .................... 370/228 |
| 2015/0043484 A1* | 2/2015 | Jung et al. ..................... 370/329 |

* cited by examiner

*Primary Examiner* — Chi H Pham
*Assistant Examiner* — Soon-Dong D Hyun
(74) *Attorney, Agent, or Firm* — Rabin & Berdo, P.C.

(57) ABSTRACT

A synchronization group management apparatus of a node recognizes a node belonging to a different group if groups having mobility are moved and located in the same area, and performs an operation of merging the different groups into one group by changing the frame start time and the synchronization reference time of the node.

20 Claims, 13 Drawing Sheets

METHOD AND APPARATUS FOR MANAGING SYNCHRONIZATION GROUPS IN WIRELESS COMMUNICATION SYSTEM

CROSS-REFERENCE TO RELATED APPLICATION

This application claims priority to and the benefit of Korean Patent Application No. 10-2013-0033048 filed in the Korean Intellectual Property Office on Mar. 27, 2013, the entire contents of which are incorporated herein by reference.

BACKGROUND OF THE INVENTION (a) Field of the Invention

The present invention relates to a method and apparatus for managing synchronization groups in a wireless communication system. More particularly, the present invention relates to a method and apparatus for managing synchronization groups which can reduce interference between different synchronization groups in a wireless communication system, such as a wireless mesh network or a mobile ad-hoc network.

(b) Description of the Related Art 802.11 Wireless Local Area Network (WLAN) technology is representative conventional wireless ad-hoc network technology. In 802.11 wireless local area network (WLAN) technology, each node in Distributed Coordination Function (DCF) mode uses a distributed access method. The distributed access method in 802.11 DCF mode is performed based on Carrier Sense Multiple Access (CSMA), and each node sends its own data according to CSMA when adjacent nodes do not send their data.

In 802.11 DCF mode, although two different networks neighbor each other, each of the nodes of the two groups can recognize the transmission of the node of the counterpart group according to CSMA and send its own data when the node of the counterpart group does not send its data.

Each node in wireless technology in which a TDMA-based frame not using CSMA, such as 802.11 Point Coordination Function (PCF) mode and 802.15.4 Guaranteed Time Slot (GTS) duration, is used, attempts to send and receive data in a slot allocated thereto. Here, the slot is allocated by taking only a node belonging to the same network into consideration. Accordingly, if an adjacent network is present, it can affect interference between groups if data is attempted to be transmitted in the allocated slot.

Furthermore, in order to determine whether or not an adjacent network is present, a broadcasting message has to be received from a node in the adjacent network. If a TDMA frame start time is different in each network, it is difficult to determine whether or not an adjacent network is present because a time during which the broadcasting message is received is different.

That is, in existing wireless technology in which a TDMA-based frame is used, there is a problem in that interference from different networks continues.

SUMMARY OF THE INVENTION

The present invention has been made in an effort to provide a method and apparatus for managing synchronization groups in a wireless communication system having the advantage of reducing interference between adjacent groups that occurs in a TDMA-based wireless network.

An exemplary embodiment of the present invention provides a method of managing a plurality of groups, included in a wireless communication network, by a synchronization group management apparatus of a node belonging to any of the plurality of groups. The method includes scanning an adjacent group different from a group to which the node belongs, determining whether the group to which the node belongs is a master group or a slave group regarding the role of the group, and performing group merging with the adjacent group if, as a result of the determination, the node is determined to be a slave group.

Performing group merging with the adjacent group if, as a result of the determination, the node is determined to be the slave group, may include changing a synchronization reference time of the slave group into a synchronization reference time of the master group and changing a group ID of the slave group into a group ID of the master group.

Changing a synchronization reference time of the slave group into a synchronization reference time of the master group may include changing a frame start time of the slave group into a frame start time of the master group and changing a frame index of the slave group into a frame index of the master group.

Changing a frame start time of the slave group into a frame start time of the master group may include obtaining the frame start time of the master group, calculating a pause duration for a frame start time identical with the frame start time of the master group, generating a group configuration update message in which a time when the frame start time is to be changed and the calculated pause duration are set, and sending the group configuration update message to all nodes within the slave group.

Changing a frame index of the slave group into a frame index of the master group may include obtaining the frame index of the master group, generating a group configuration update message in which the time when the frame index is to be changed and the frame index of the master group into which the frame index of the slave group is to be changed are set, and sending the group configuration update message to all nodes within the slave group.

Changing a group ID of the slave group into a group ID of the master group may include obtaining the group ID of the master group, generating a group configuration update message in which the time when the group ID is to be changed and the obtained group ID of the master group is set as a group ID into which the group ID of the slave group is to be changed, and sending the group configuration update message to all nodes within the slave group.

Changing a synchronization reference time of the slave group into a synchronization reference time of the master group may include receiving a group configuration update message from a node within the slave group, extracting a group configuration change time, pause duration for changing a frame start time, a new frame index, and a new group ID from the received group configuration update message, and changing a group configuration using the pause duration, the new frame index, and the new group ID after the group configuration change time and operating using the changed group configuration.

Changing a synchronization reference time of the slave group into a synchronization reference time of the master group may further include determining one of a plurality of group configuration update messages as a valid message if a node within the slave group receives the plurality of group configuration update messages.

The method may further include instructing a node belonging to a non-GPS synchronization group on the change of a frame start time, a frame index, and a group ID if the node that is a GPS-enabled node enters the non-GPS synchronization group.

The method may further include periodically changing a group ID of the group of the node if the group of the node is a non-GPS synchronization group and sending the changed group ID to the non-GPS synchronization group.

Periodically changing a group ID of the group of the node if the group of the node is a non-GPS synchronization group may include determining a group ID into which the group ID of the group of the node is to be changed based on whether or not the group includes a GPS-enabled node and a size of the group.

Scanning an adjacent group different from a group to which the node belongs may include receiving a control signal from an adjacent node and comparing a group ID, a frame start time, and a frame index, included in the control signal, with a group ID of the group to which the node belongs and a frame start time and a frame index allocated to the group to which the node belongs, respectively, and determining whether a group to which the adjacent node belongs is the adjacent group based on a result of the comparison.

The control signal may be transmitted in a first subframe of a superframe that is a multiple of a predetermined transmission period of the control signal, and receiving a control signal from an adjacent node may include receiving the control signal in an idle frame having a location changed for each period.

Determining whether the group to which the node belongs is a master group or a slave group regarding the role of the group may include comparing a group ID value of the adjacent group with a group ID value of the group to which the node belongs and determining a group having a greater value as the master group as a result of the comparison, and comparing the frame start time or the frame index, included in the control signal, with the frame start time or the frame index allocated to the group to which the node belongs and determining a group having a earlier value as the master group as a result of the comparison, if, as a result of the comparison, the group ID value of the adjacent group is identical with the group ID value of the group to which the node belongs.

Another exemplary embodiment of the present invention provides the synchronization group management apparatus of a node belonging to any of a plurality of groups included in a wireless communication network. The synchronization group management apparatus includes a receiver and a controller. The receiver receives a control signal from an adjacent node. Furthermore, the controller determines whether or not a group to which the adjacent node belongs is different from a group to which the node belongs based on the control signal, and changes a frame start time and a synchronization reference time of the group to which the node belongs into a frame start time and a synchronization reference time of the group to which the adjacent node belongs, if the group to which the adjacent node belongs is a master group and the group to which the node belongs is a slave group.

The controller may obtain the frame start time and the synchronization reference time of the master group through the control signal.

The synchronization group management apparatus may further include a transmitter. The controller may periodically change a group ID of the node if the group to which the node belongs is a non-GPS synchronization group, and the transmitter may send a group configuration update message, comprising the changed group ID, to the non-GPS synchronization group.

The synchronization group management apparatus may further include a transmitter. The controller may generate a group configuration update message in which a frame start time and a frame index into which a frame start time and a frame index of the node are to be changed are set, and the transmitter may send the group configuration update message to a node within the slave group.

The controller may compare a group ID value of the adjacent group with a group ID value of the group to which the node belongs, determine a group having a greater value as the master group as a result of the comparison, compare a frame start time or a frame index included in the control signal with a frame start time or a frame index allocated to the group to which the node belongs if, as a result of the comparison, the group ID value of the adjacent group is identical with the group ID value of the group to which the node belongs, and determine a group having a earlier value as the master group as a result of the comparison.

The receiver may receive a group configuration update message from a node within a group identical with the group to which the node belongs, and the controller may change a frame reference time, a frame index, and a group ID based on the received group configuration update message.

DETAILED DESCRIPTION OF THE EMBODIMENTS

Figure 1:
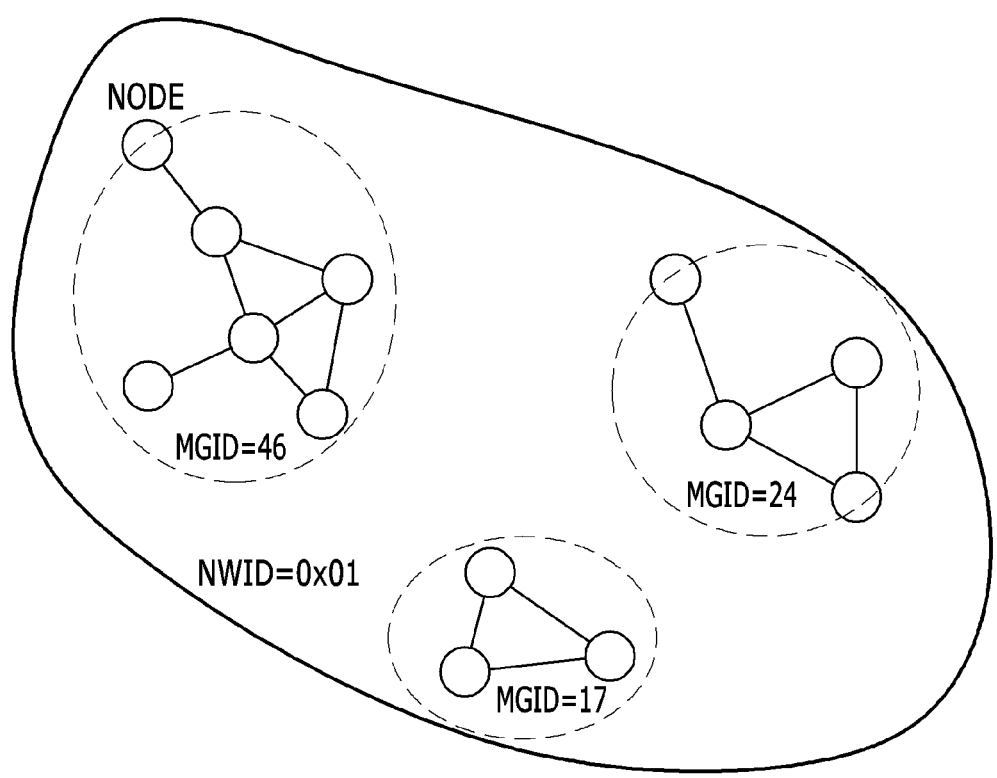
FIG. 1 is a diagram showing a wireless communication network in accordance with an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification and claims, unless explicitly described to the contrary, the word "comprise" and variations such as "comprises" or "comprising" will be understood to imply the inclusion of stated elements but not the exclusion of any other elements.

A method and apparatus for managing synchronization groups in a wireless communication system in accordance with exemplary embodiments of the present invention are described in detail below with reference to the accompanying drawings.

FIG. 1 is a diagram showing a wireless communication network in accordance with an exemplary embodiment of the present invention.

Referring to FIG. 1, a wireless communication network, such as a mobile ad-hoc network or a wireless mesh network, includes a set of nodes using the same wireless technology, and nodes belonging to the same network can exchange data through a connected link. FIG. 1 shows a wireless mesh network as an example.

The nodes of the wireless mesh network can be classified into a plurality of groups depending on the locations of the nodes. Nodes belonging to each group can exchange data if they are connected to one another.

It is assumed that a synchronization group includes a set of nodes coupled directly or in multi-hops, and nodes belonging to the same synchronization group can maintain the same synchronization reference time.

Figure 2:
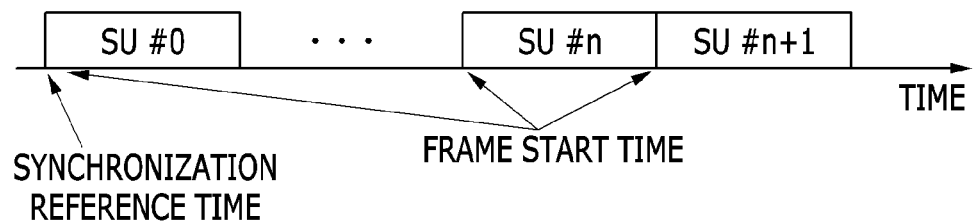
FIG. 2 is a diagram showing an example of a synchronization reference time in accordance with an exemplary embodiment of the present invention.

FIG. 2 is a diagram showing an example of a synchronization reference time in accordance with an exemplary embodiment of the present invention.

Referring to FIG. 2, a synchronization reference time can be defined as a reference time that must be maintained in order for several nodes to operate in the same superframe (SU) structure. For example, the start time of a frame index No. 0 (superframe #0) can be defined as the synchronization reference time. Nodes that maintain the same synchronization reference time know the frame start time of each frame structure identically, and share the same frame index value.

Each network is identified by a network identifier NWID, and each synchronization group is identified by a group ID (MGID). For example, as in FIG. 1, nodes within a wireless mesh network having a network identifier NWID of 0x01 can be classified into three synchronization groups having respective group ID MGIDs 46, 17, and 24.

The synchronization groups (e.g., MGID=46, MGID=17, and MGID=24) can be classified into a GPS synchronization group and a non-GPS synchronization group depending on whether or not a synchronization reference time using a GPS has been set.

The GPS synchronization group refers to a group in which a synchronization reference time has been set to a specific absolute time (e.g., 0 seconds, 0 minutes, 0 hours, Jan. 1, 2000). To this end, at least one node must be able to obtain time information using a GPS.

The non-GPS synchronization group refers to a group in which a synchronization reference time is set to a random time rather than a specific absolute time. If a node first forming a group does not use a GPS, the node may form a non-GPS synchronization group because a synchronization reference time (i.e., a frame start time and a frame index) is randomly set.

Figure 3:
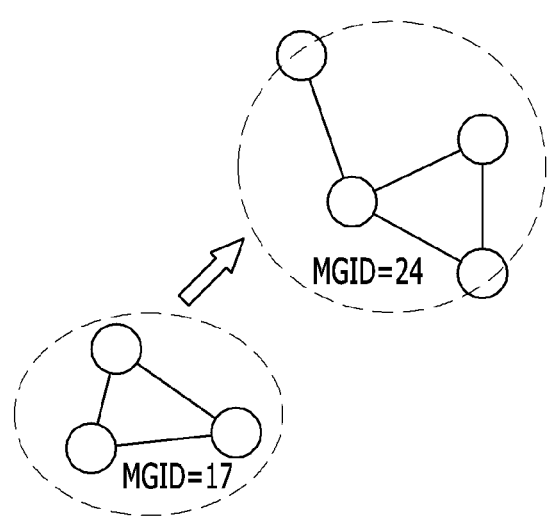
FIG. 3 is a diagram showing an example of two adjacent synchronization groups in a wireless communication system in accordance with an exemplary embodiment of the present invention.

FIG. 3 is a diagram showing an example of two adjacent synchronization groups in a wireless communication system in accordance with an exemplary embodiment of the present invention.

Referring to FIG. 3, nodes in a wireless mesh network are provided with mobility. Accordingly, if any one synchronization group (e.g., MGID=17) moves due to mobility and neighbors a different synchronization group (e.g., MGID=24), interference may occur between nodes belonging to different synchronization groups. A method of reducing interference between nodes belonging to different synchronization groups is described below.

Figure 4:
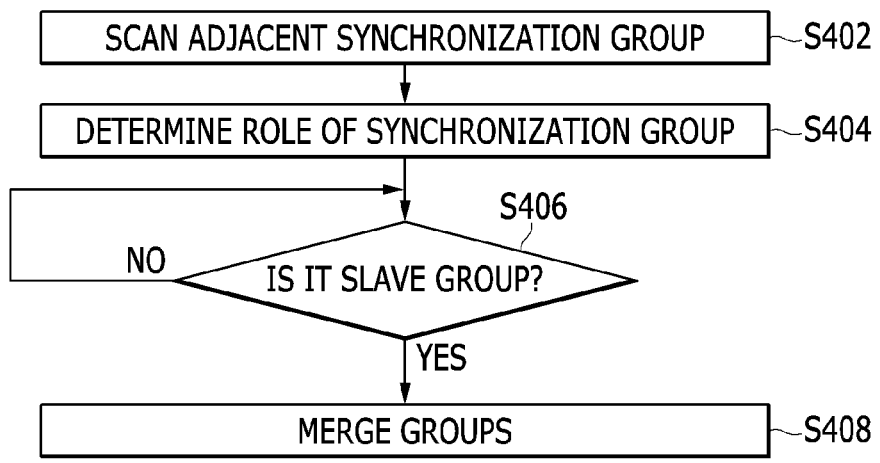
FIG. 4 is a diagram showing a group management method in a wireless communication system in accordance with an exemplary embodiment of the present invention.

FIG. 4 is a diagram showing a group management method in a wireless communication system in accordance with an exemplary embodiment of the present invention.

Referring to FIG. 4, the node of a synchronization group scans an adjacent synchronization group at step S402. In order to scan the adjacent synchronization group, the node of the synchronization group has to be able to receive signals from nodes belonging to the adjacent synchronization group.

A signal used to scan a synchronization group includes a long-distance beacon signal and a network configuration (NCFG) message.

Figure 5:
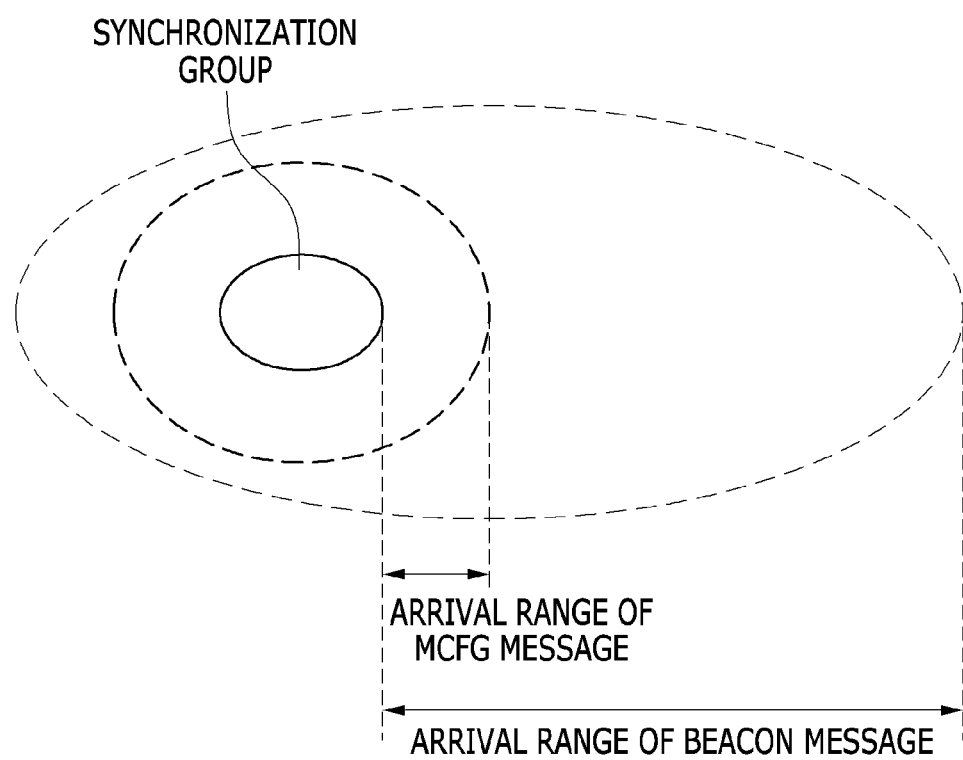
FIG. 5 is a diagram showing the signal arrival ranges of a long-distance beacon signal and an NCFG message in accordance with an exemplary embodiment of the present invention.

FIG. 5 is a diagram showing the signal arrival ranges of the long-distance beacon signal and the NCFG message in accordance with an exemplary embodiment of the present invention.

As shown in FIG. 5, the long-distance beacon signal can be used to synchronize the time and frequency between groups that are present out of the arrival distance of an NCFG message. Here, the time synchronization refers to a frame start time.

A node that sends a long-distance beacon signal sends its own group ID MGID in the form of the code of a signal. A node that has received the code of the signal can know the group ID MGID of a group to which the node that has sent the code of the signal using the code of the signal.

An NCFG message includes both a group ID and a frame index. When two synchronization groups are within the arrival distance of the NCFG message, the two synchronization groups synchronize the synchronization reference time using the frame index within the NCFG message.

A method of receiving a signal used to scan a synchronization group includes two methods. In the first method, an idle frame is allocated in such a manner that all nodes within a synchronization group are synchronized, and all the nodes receive signals from an adjacent synchronization group in the allocated idle frame. This method is called an idle frame scanning method. In the second method, an additional idle frame is not allocated, but a receiver is activated in a subframe or frame in which each node does not send data. This method involves scanning a signal transmitted by an adjacent node, and is also called a background scanning method. The background scanning method may not be used or may be used along with the idle frame scanning method.

Referring back to FIG. 4, in the procedure for scanning an adjacent synchronization group, the node that has received a long-distance beacon signal or an NCFG message from an adjacent node determines whether or not the adjacent node belongs to a different synchronization group. Here, the determination method can be performed by comparing group IDs with each other and synchronization reference times with each other.

If the adjacent node has a different group ID as a result of comparing the group ID of the received long-distance beacon signal or NCFG message with the group ID of its own group, the node determines that the adjacent node belongs to a different synchronization group.

As described above, if the synchronization group of the node is different from the synchronization group of the adjacent node, the node determines the role of the synchronization group to which the node belongs at step S404. That is, the node determines whether the synchronization group to which the node belongs is a master group or a slave group. To determine whether the synchronization group is a master group or a slave group can be determined by comparing group ID values with each other. The node determines that a group having a greater group ID value is a master group.

Meanwhile, although the group ID of the synchronization group to which the node belongs is identical with the group ID of the NCFG message received from the adjacent node, the time may not be synchronized with that of the adjacent node. For example, when group IDs are updated in synchronization groups, two or more groups may select an identical group ID as a new group ID. Accordingly, if the group ID of the synchronization group to which the node belongs is identical with that of the NCFG message received from the adjacent node, the node compares synchronization reference times with each other and determines whether or not the adjacent node that has sent the long-distance beacon signal or the NCFG message belongs to a different synchronization group as a result of the comparison.

If a long-distance beacon signal or an NCFG message having the same group ID has been received from an adjacent node, a node compares synchronization reference times with each other. If, as a result of the comparison, the synchronization reference times are identical with each other, the node determines that the adjacent node belongs to the same synchronization group. The comparison of the synchronization reference times can be performed by comparing the frame index of the synchronization group to which the node belongs with the frame index of the adjacent synchronization group to which the adjacent node belongs if the NCFG message is received. If the frame index is unable to be received, that is, if only the long-distance beacon signal is received, the comparison of the synchronization reference times can be performed by comparing the frame start time of the synchronization group to which the node belongs with the frame start time of the adjacent synchronization group to which the adjacent node belongs.

A difference in the synchronization reference time or the frame start time can be performed by determining whether or not a difference between the synchronization reference times or frame start times of the two synchronization groups is a maximum value or more of a predetermined drift time.

If, as a result of comparing the synchronization reference times with each other using the NCFG message received from the adjacent node having the same group ID MGID, the synchronization reference time of the adjacent node is different from that of the node, the node determines that the adjacent node belongs to a different synchronization group and determines the role of a synchronization group. In this case, since the group ID values are identical with each other, the node can compare the synchronization reference times of the two synchronization groups with each other and determine that a group having a earlier synchronization reference time is a master group as a result of the comparison.

If, as a result of comparing the frame start times with each other using the long-distance beacon signal received from the adjacent node having the same group ID MGID, the adjacent node has a different frame start time from the node, the node can determine that the adjacent node belongs to a different synchronization group and determine the role of a synchronization group using its frame start time. Here, the node can compare the frame start times of the two synchronization groups with each other and determine that a group having a earlier frame start time is a master group. That is, from a viewpoint of the node of any one synchronization group, if the frame start time of the adjacent synchronization group is present in a −[½*superframe duration]−0 time on the basis of the frame start time of the node, the adjacent synchronization group becomes a master group. If not, the synchronization group to which the node belongs becomes a master group.

If the synchronization group of the node that has scanned the adjacent synchronization group is a master group at step S406, the node does not start group merging. If the synchronization group of the node that has scanned the adjacent synchronization group is a slave group at step S406, the node starts group merging at step S408.

A procedure for performing group merging is performed through a group configuration update procedure. The group configuration update procedure can be used to change the synchronization reference time or group ID of a group using a GPS-enabled node in a non-GPS synchronization group in addition to group merging procedure.

Figure 6:
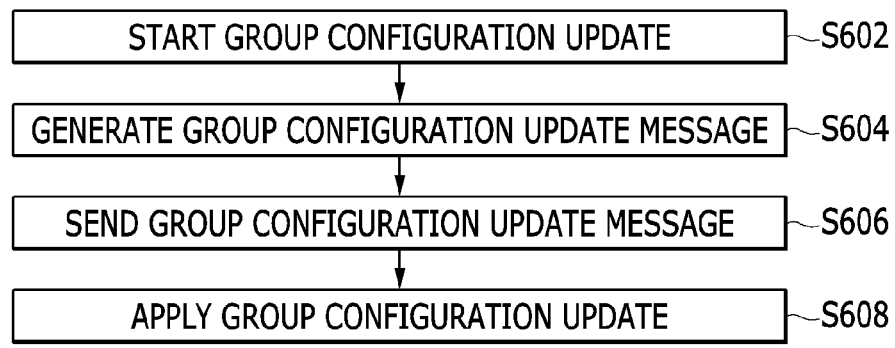
FIG. 6 is a flowchart illustrating a group configuration update method in accordance with an exemplary embodiment of the present invention.

FIG. 6 is a flowchart illustrating a group configuration update method in accordance with an exemplary embodiment of the present invention. Referring to FIG. 6, in a slave group, a node that starts a group configuration update procedure, such as a node that starts group merging procedure, a node that starts the change of a synchronization reference time within a group, or a node that starts the change of a group ID within a group, is called a delegate node.

In a process of starting a group configuration update procedure, one or a plurality of nodes of nodes that form a group becomes a delegate node and starts the group configuration update procedure at step S602.

In group merging procedure, a node that has scanned an adjacent synchronization group becomes a delegate node and starts a group configuration update procedure.

In a synchronization time change procedure within a synchronization group, if a node having a GPS enters a non-GPS synchronization group, the node having a GPS becomes a delegate node and starts a group configuration update procedure.

In a group ID change procedure within a synchronization group, a node having the smallest node identifier (NID) within a group becomes a delegate node and starts a group configuration update procedure according to the change cycle of a group ID.

When the group configuration update is started (S602), a group configuration update message is generated at step S604. At step S604, a delegate node generates the group configuration update message.

After the group configuration update message is generated, the delegate node sends the group configuration update message at step S606. At step S606, the group configuration update message generated by the delegate node is transmitted to all nodes within the group. To this end, a node that has received the group configuration update message can propagate the received group configuration update message to all the nodes of the group by forwarding the received group configuration update message.

In addition, the node that has received the group configuration update message can send the group configuration update message to all the nodes of the group using a more efficient network broadcast method, if any.

If a group configuration update procedure is performed for group merging procedure, several nodes may scan adjacent master groups at the same time. In this case, a plurality of delegate nodes may generate and send a plurality of group configuration update messages. In this case, only one of the plurality of delegate nodes is valid depending on priority of each delegate node.

The priority of each delegate node can be determined based on the time that each delegate node scans an adjacent group. The time can be known through the discovery time field of a group configuration update message. If several delegate nodes have the same time, a delegate node having a smaller node identifier (NID) has the highest priority.

Regarding the middle node of a slave group, priorities of delegate nodes that receive group configuration update messages are compared with each other. If, as a result of the comparison, the group configuration update message of a delegate node having lower priority is received later than the group configuration update message of a delegate node having higher priority, the group configuration update message of a delegate node having lower priority is not transmitted.

At step S608, all nodes within a slave group change their times, frequencies, and group IDs at the same time based on the time and item to which the received group configuration update message is applied.

The group configuration update message can be configured as in Table 1.

TABLE 1

| Syntax | Size (bits) | Description |
| --- | --- | --- |
| Group Configuration Update MSG ( ){ | | |
| Delegate Node ID | 12 | NID of delegate node |
| Transmission Time | 16 | Frame index of transmission start time at Delegate Node |
| Repetition Number | 3 | Number of repeated transmission of this MSG |
| Configuration Update Time | 16 | Frame Index of configuration change start time |
| Frame Reference Time Change Flag | 1 | Indicates the changes of Frame reference time If this bit is set to 1, all the nodes in the group changes frame reference time after Configuration Update Time by delaying Pause Duration |
| Frame Index Change Flag | 1 | Indicates the change of Frame Index If this bit is set to 1, all the nodes in the group changes Frame Index after Configuration Update Time |
| Frequency Offset Change Flag | 1 | Indicates the change of Frequency Offset If this bit is set to 1, all nodes in the group changes Frequency Offset after Configuration Update Time |
| Group ID Change Flag | 1 | Indicates the changes of Group ID If this bit is set to 1, all the nodes in the group changes Group ID after Configuration Update Time as New MGID |
| If(Frame Reference Time Change Flag==1) { | | |
| Pause Symbols | 8 | Number of symbols to pause after Configuration Update Time |
| Pause Samples | 8 | Number of samples to pause after Configuration Update Time |
| } If(Frame Index Change Flag == 1) { | | |
| New Frame Index | 16 | New Frame Index after Configuration Update Time |
| } If(Frequency Offset Change Flag == 1) { | | |
| Frequency offset adjustment | 9 | The correction is 1% of the subcarrier spacing (* fl) multiplied by the 9-bit number interpreted as a signed integer. MSB 1 bit represents the sign of the value. That is, the value is negative (−) if the MSB = 0b1 and the value is positive (+) if the MSB = 0b0. LSB 8 bits represent frequency offset correction value of [1 . . . 256] that corresponds to 0x00-0xFF, respectively. |
| } If(Group ID Change Flag == 1) { | | |
| New MGID | 8 | New MGID after Configuration Update Time |
| } } | | |

Figure 7:
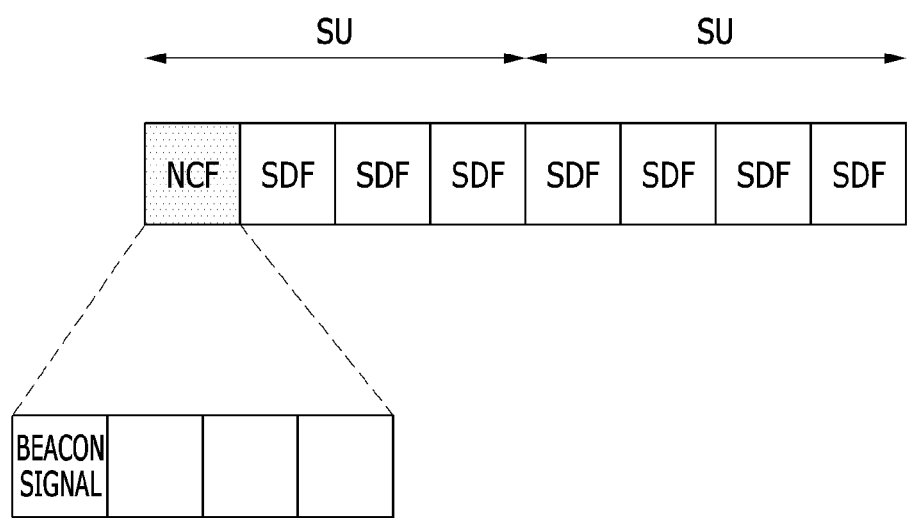
FIG. 7 is a diagram showing a method of transmitting a long-distance beacon signal in accordance with an exemplary embodiment of the present invention.

FIG. 7 is a diagram showing a method of transmitting a long-distance beacon signal in accordance with an exemplary embodiment of the present invention.

In order to scan an adjacent group at a long distance, nodes within each synchronization group send long-distance beacon signals at predetermined locations.

All the nodes of the synchronization group send the long-distance beacon signals at the same time in order to minimize interference within the synchronization group due to the transmitted beacon signals and increase the intensity of a signal received by an adjacent synchronization group.

Referring to FIG. 7, the long-distance beacon signal is transmitted in the network entry (NENT) subframe, that is, the first subframe of a network control frame (NCF) and used for initial transmission of new node in the network. The transmission period of a beacon signal ($P_{BCN}$) is determined by the beacon period parameter of a network configuration descriptor (NWCD) information element (IE) and is defined as a multiple of an NCF cycle.

A superframe includes a plurality of frames. In at least one superframe, one frame may be an NCF depending on an NCF period, and the remaining frames may be scheduling and data frames (SDFs).

If the transmission period ($P_{BCN}$) parameter of a beacon signal is 0, no nodes within a group send a beacon signal. If the transmission period ($P_{BCN}$) parameter of a beacon signal is not 0, each of nodes within a group sends a beacon signal in the NENT subframe of a superframe SU that becomes a multiple of the transmission period $P_{BCN}$. That is, each node sends the beacon signal in a superframe that satisfies mod (SFN, $P_{BCN}$)=0. Here, the SFN indicates a superframe number.

This long-distance beacon signal has priority over access to an entering node in the NENT subframe of a superframe in which the long-distance beacon signal is transmitted. To this end, the entering node does not send a ranging code and a message for an entry procedure in the NENT subframe in which the beacon signal is transmitted.

The transmission of the beacon signal also has priority over the allocation of an idle frame. If an NCF frame for sending the beacon signal is selected as an idle frame, the beacon signal is transmitted in the NENT subframe and the remaining subframes then operate as idle frames.

An idle frame is allocated to the node of a synchronization group that scans an adjacent synchronization group using the idle frame by the period $P_{Idle}$, which is called idle frame scheduling.

The NCF period $P_{NCF}$ of each synchronization group is defined by a frame structure. The idle period $P_{Idle}$ indicates the period in which the idle frame is allocated in terms of a superframe. The idle period $P_{Idle}$ is defined as an F idle frame period parameter, and it has a unit of a superframe. If the F idle frame period parameter is 0, a corresponding synchronization group does not scan an adjacent group using an idle frame.

The idle frame is allocated to one frame by the idle period $P_{Idle}$. Since one superframe SU includes 4 frames, $4*P_{Idle}$ frames are present in the idle period $P_{Idle}$, and the location [i(k)] of an idle frame in a $k^{th}$ idle period is determined according to Equation 1.

$$i(k)=\mod(k+o(k), 4 \times P_{Idle}) \quad \text{(Equation 1)}$$

In Equation 1, k is a value increased by 1 for each idle period, and o(k) is defined as in Equation 2.

$$o(k)=\text{floor}(k/(4 \times P_{Idle})) \quad \text{(Equation 2)}$$

In the aforementioned idle frame allocation method, the location of an idle frame is changed for each idle period, and an offset is changed for each idle frame repetition cycle ($4*P_{Idle}$ idle periods). If this idle frame scheduling is used, a group having $P_{BCN}$ smaller than or equal to $4*(P_{Idle})*2$ can be scanned. An example of a method of allocating idle frames is described with reference to FIG. 8.

Figure 8:
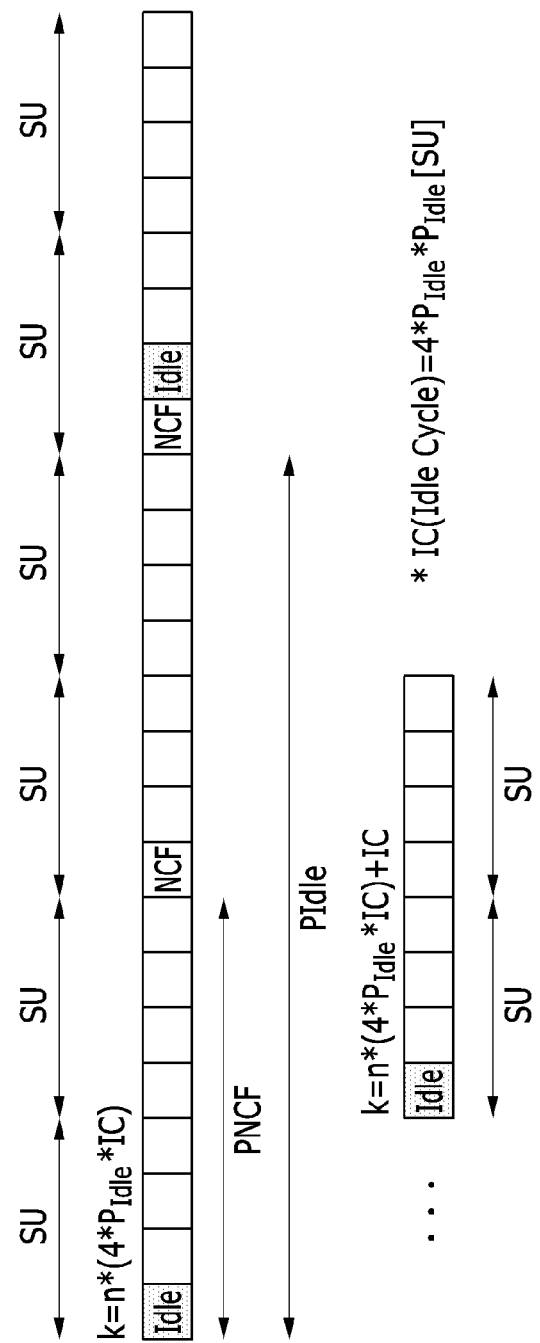
FIG. 8 is a diagram showing an example of a method of allocating idle frames in accordance with an exemplary embodiment of the present invention.

FIG. 8 is a diagram showing an example of a method of allocating idle frames in accordance with an exemplary embodiment of the present invention.

As shown in FIG. 8, an idle frame is allocated to one frame by the idle period $P_{Idle}$.

A location to which the idle frame is allocated is changed over time, and the location is the location of an NCF or SDF frame. The idle frame has priority over an NCF frame and an SDF frame, and no nodes send frames in the idle frame.

When nodes within a synchronization group use idle frame scheduling, if the period of the idle frame of an NWCD IE is not 0, a distributed scheduling may consider the location of idle frames and not schedule to transmit the control and data messages in the idle frames. Furthermore, the scheduling of the data subframe of an SDF frame is also allocated by taking the location of the idle frame into consideration.

Figure 9:
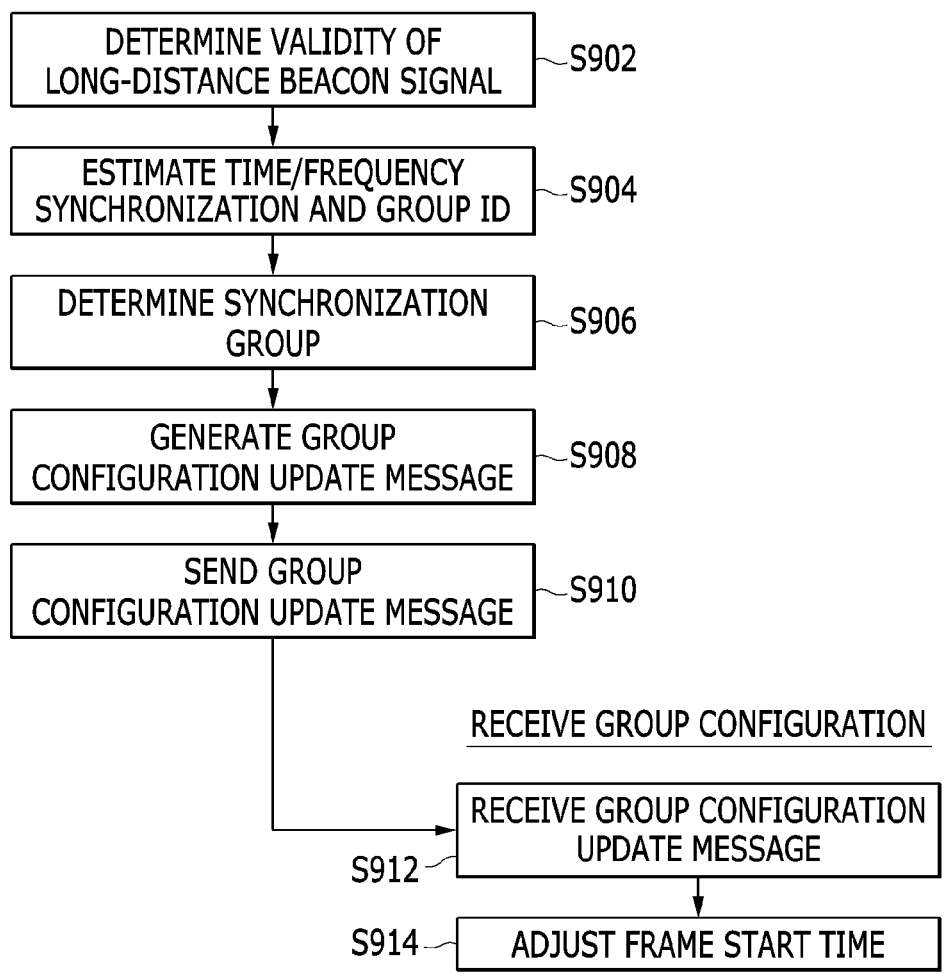
FIG. 9 is a diagram showing a method of changing a frame start time for group merging in accordance with an exemplary embodiment of the present invention.

FIG. 9 is a diagram showing a method of changing a frame start time in accordance with an exemplary embodiment of the present invention.

Referring to FIG. 9, a frame start time is changed in order to reduce interference between synchronization groups before two groups reach a range in which interference has a direct influence on the two groups.

A node that has scanned a master group performs this procedure in order to synchronize the frame start time of nodes that belong to a slave group with the frame start time of the master group.

A delegate node that starts the change of a frame start time within a slave group can know the frame start time of a master group based on a long-distance beacon signal from the node of a master group.

The delegate node determines whether or not the received long-distance beacon signal is valid at step S902. For example, the delegate node measures the SNR of the received long-distance beacon signal, receives a beacon signal greater than a threshold value BC_Threshold, that is, a system parameter, by a predetermined number BC_Repetition, and then performs group merging using estimated time/frequency synchronization and an estimated group ID value.

If, as a result of the determination, the received long-distance beacon signal is valid, the delegate node estimates time/frequency synchronization and a group ID from the received long-distance beacon signal at step S904.

After estimating the time/frequency synchronization, the delegate node determines a synchronization group at step S906. At step S906, the delegate node determines whether or not a node that has sent the long-distance beacon signal belongs to a different synchronization group using the estimated time/frequency and group ID. If the long-distance beacon signal is received from a node belonging to a different synchronization group, the delegate node determines the role of a group to which the delegate node belongs as a master or slave group.

If the group to which the delegate node belongs to a slave group, the delegate node performs a procedure for changing a frame start time for a synchronization group merger. To this end, the delegate node generates a group configuration update message at step S908 and sends the group configuration update message to all nodes within the group at step S910.

In the procedure for generating the group configuration update message, the delegate node designates the configuration update time of the group configuration update message as the next index of the last superframe in which current synchronization group setting remains intact. That is, the delegate node designates a time after the group configuration update message is transferred to all nodes within a network as the configuration update time. To this end, the configuration update time can be designated as a frame index that is much greater than a current frame index.

Furthermore, the delegate node sets the superframe start time change flag of the group configuration update message to 1, and includes a pause symbol field and a pause sample field in the group configuration update message for the purpose of a pause duration that is inserted after the group configuration update time. If a master group and a frequency offset need to be adjusted, the delegate node may include a frequency offset adjustment field in the group configuration update message and set a frequency offset change flag to 1.

A node within a slave group that has received the group configuration update message receives the group configuration update message at step S912, and then operates based on the group configuration update message. That is, in order to change a frame reference time, each node within the slave group adjusts the frame start time by inserting the pause duration designated in a group configuration update time indicated in the group configuration update message at step S914. If the adjustment of a frequency offset is requested, each node adjusts the frequency offset with reference to a value of the frame offset adjustment field. The pause duration is set by the delegate node. For example, if the delegate node has estimated the frame start time of a master group and the estimated frame start time is later than the frame start time of the slave group by 'a', the delegate node sets the pause duration to 'a' so that the frame start time of the slave group is identical with the frame reference time of the master group.

If a node within the slave group receives a plurality of group configuration update messages, the node can determine one of the plurality of group configuration update messages as a valid group configuration update message.

The delegate node can estimate time/frequency synchronization for a long-distance beacon signal that is received after a frame start time within a slave group has been adjusted using the group configuration update message. For example, if the estimated time/frequency synchronization have time difference threshold value BC_Estimation_Time_Difference/frequency difference threshold value BC_Estimation_Frequency_Difference or higher, that is, system parameters, the delegate node can change time/frequency synchronization values using the group configuration update message again.

Figure 10:
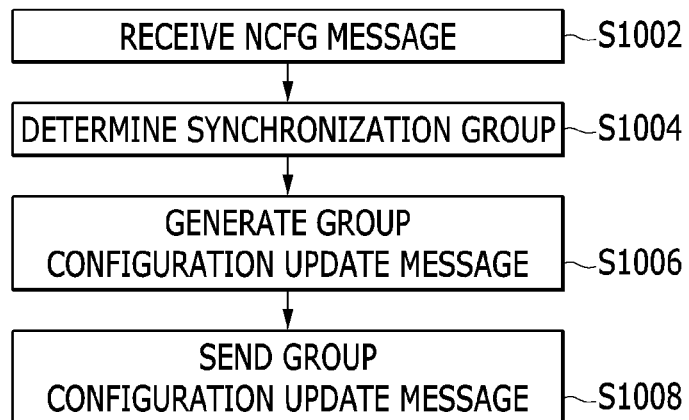
FIG. 10 is a diagram showing a method of changing a synchronization reference time for group merging in accordance with an exemplary embodiment of the present invention.
Figure 10:
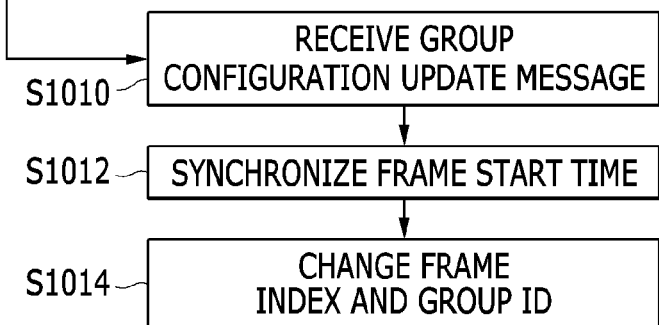

FIG. 10 is a diagram showing a method of changing a synchronization reference time for group merging in accordance with an exemplary embodiment of the present invention.

Referring to FIG. 10, in order for two synchronization groups to be merged, the synchronization reference times of all nodes within a slave group must be synchronized with the synchronization reference time of a master group. To this end, a frame start time and a frame index must be synchronized. Accordingly, after the frame start time is scanned and the frame index is received based on a received NCFG message, group merging procedure can be performed.

A delegate node within the slave group that tries to adjust a synchronization reference time for group merging uses a group configuration update message like in the change of a frame start time.

The delegate node receives an NCFG message from an adjacent group at step S1002.

The delegate node determines whether or not a node that has sent the NCFG message belongs to a different synchronization group at step S1004.

If the NCFG message has been received from a node belonging to a different synchronization group, the delegate node starts a group configuration update procedure for group merging. To this end, the delegate node generates a group configuration update message at step S1006 and sends the group configuration update message at step S1008.

The delegate node sets both the frame start time change flag and the frame index change flag of the group configuration update message to 1. If a frame start time using a long-distance beacon signal is set identically with a master group, the frame start time change flag may be set to 0 and omitted.

Furthermore, for group merging, both a synchronization reference time and a group ID need to be changed. To this end, the group ID (MGID) change flag of the group configuration update message is set to 1, and thus a group ID field after a group configuration update time is included in the group configuration update message.

When nodes within the slave group receive the group configuration update message from the delegate node at step S1010, the nodes operate based on the group configuration update message. That is, in order to change a synchronization reference time, each node within the slave group synchronizes its frame start time with that of the delegate node by inserting a pause duration after a configuration update time indicated in the group configuration update message at step S1012, changes its frame index and group ID at step S1014, and operates based on the changed frame index and changed group ID after the pause duration. Both the changed frame index and the changed group ID are included in the group configuration update message.

If a node within the slave group receives a plurality of group configuration update messages, the node can determine one of the plurality of group configuration update messages as a valid message as in the previous explanation.

Figure 11:
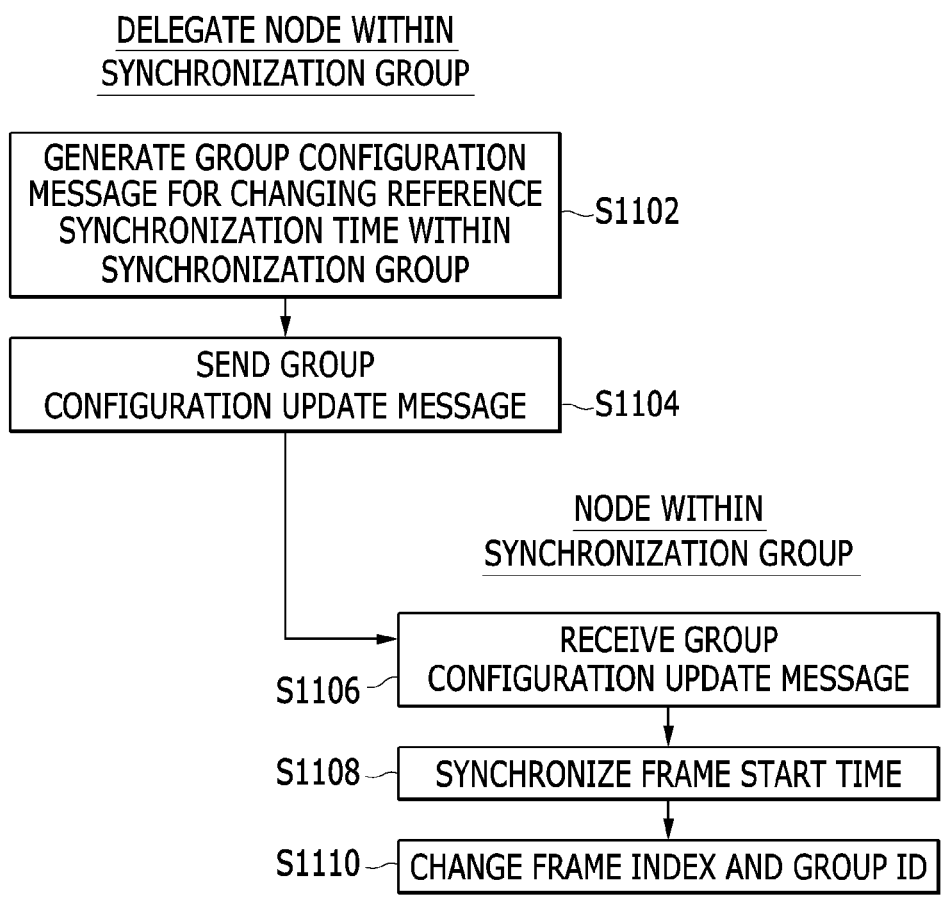
FIG. 11 is a diagram showing a method of changing a synchronization reference time within a synchronization group in accordance with an exemplary embodiment of the present invention.

FIG. 11 is a diagram showing a method of changing a synchronization reference time within a synchronization group in accordance with an exemplary embodiment of the present invention.

Referring to FIG. 11, a non-GPS synchronization group refers to a group whose synchronization reference time has been set to a random time. Although all nodes are not GPS-enabled nodes, time information can be obtained through at least one GPS-enabled node. The synchronization reference time of a group using the time information can be adjusted as an absolute reference time.

A procedure for adjusting the synchronization reference time of a group that operates based on a random time as an absolute reference time based on a GPS can be started when a GPS-enabled node enters the group.

The adjustment of a synchronization reference time within a synchronization group is also started based on a group configuration update message as in the change of a synchronization reference time for group merging. Here, a delegate node becomes a GPS-enabled node.

In order to change the synchronization reference time within the synchronization group, the delegate node generates a group configuration update message at step S1102, and starts a procedure for changing the synchronization reference time within the synchronization group by sending the group configuration update message to all nodes within a slave group at step S1104.

Like in the change of a synchronization reference time for group merging, the delegate node sets all of the frame start time change flag, the frame index change flag, and the group ID change flag of the group configuration update message to 1. The delegate node sets a pause duration after a configuration update time and a frame index using a difference between an absolute reference time and a current time. A new group ID is set to 255 meaning an operation as a GPS synchronization group.

When receiving the group configuration update message from the delegate node at step S1106, each node within the synchronization group synchronizes its frame start time with that of the delegate node by inserting the pause duration after the configuration update time of the group configuration update message at step S1108, changes its frame index and group ID at step S1110, and operates based on the changed frame index and the changed group ID after the pause duration.

Figure 12:
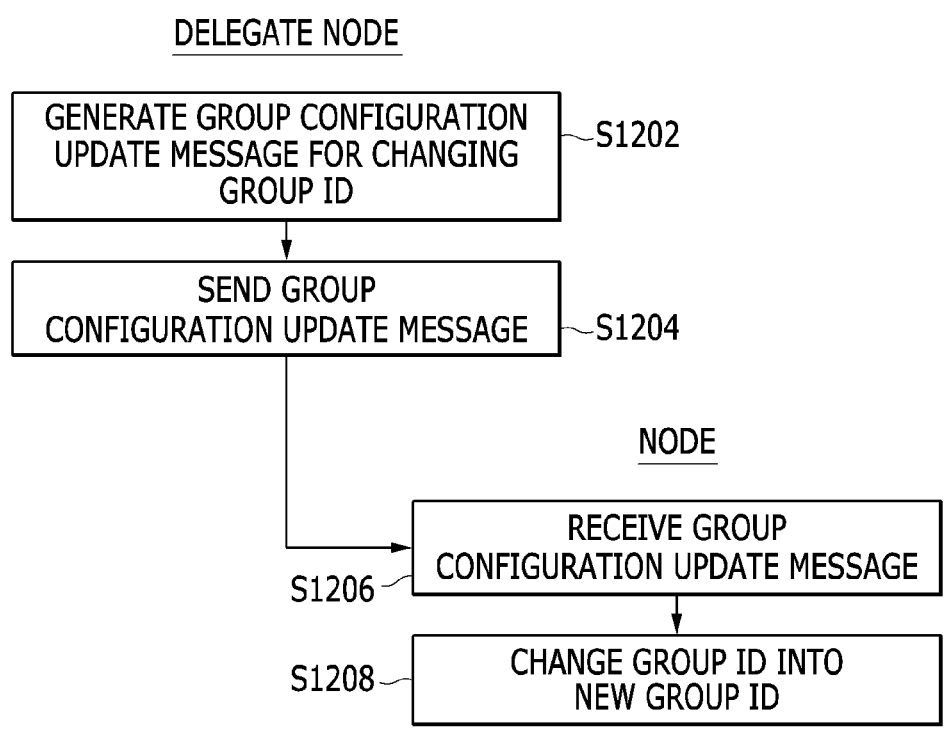
FIG. 12 is a diagram showing a method of periodically changing a group ID within a synchronization group in accordance with an exemplary embodiment of the present invention.

FIG. 12 is a diagram showing a method of periodically changing a group ID within a synchronization group in accordance with an exemplary embodiment of the present invention.

Referring to FIG. 12, a non-GPS synchronization group is unable to adjust a synchronization reference time based on an absolute time. Thus, nodes separated from one synchronization group do not have the same synchronization reference time as the nodes of the original synchronization group after a lapse of some time. Accordingly, the separated nodes are recognized as belonging to a different synchronization group after a lapse of some time. For this reason, the group ID of nodes within each synchronization group is changed into a new value at a specific interval.

A node having the smallest node identifier within the synchronization group is selected as a delegate node that starts a procedure for updating the group ID. The update period of the group ID is defined by the group ID update interval field of an NWCD IE.

The delegate node that starts the update of the group ID generates a group configuration update message for changing the group ID whenever a frame index is changed into a multiple of the group ID update interval at step S1202, and sends the group configuration update message to a network at step S1204. The delegate node sets the group ID change flag of the group configuration update message to 1 and includes a new group ID to be applied after a configuration update time in a new group ID field.

When receiving the group configuration update message at step S1206, a node within the synchronization group operates based on an existing group ID until a configuration update time included in the group configuration update message and changes its group ID into the new group ID from the superframe of the configuration update time, that is, a corresponding superframe, at step S1208.

A GPS synchronization group does not need to change its group ID periodically because it can adjust its synchronization reference time based on time information received by a GPS-enabled node. Accordingly, each of nodes belonging to a group having a group ID of 255 does not select a delegate node and start, sending the group configuration update message although a group ID update period is reached.

All nodes within a synchronization group inform other nodes within the synchronization group whether or not a GPS is possible through a GPS-enabled node flag, from among periodically transmitted routing update messages. The routing update message can be configured as in Table 2.

TABLE 2

| Syntax | Size (bits) | Description |
| --- | --- | --- |
| Routing Update MSG ( ){ | | |
| Source Node ID | 12 bits | Source of Routing Information |
| Sequence Number | 8 | Sequence number of this Routing Update MSG |
| GPS Enabled Node Flag | 1 bit | Indicates the use of GPS in this node |
| Num NIDs | 4 bits | Number of neighbor nodes at the source node |
| For (j=0;j<Num NIDs;j++) { | | |
| NID | 12 bits | NID of the neighbor node |
| SINR | 4 bits | SINR of link to neighbor node Bits 0-3: If bits 0-3 represent the binary representation of the integer N, then the SINR = −4 + 2 * N [dB] |
| } | | |
| } | | |

Each of nodes within a synchronization group can know whether or not a GPS-enabled node is present within the synchronization group based on a received routing update message. If a GPS-enabled node is not present in the GPS synchronization group, the nodes can select a delegate node in a next group ID update period, and change their group ID using a method such as that in a non-GPS synchronization group.

A group ID is allocated to each synchronization group by incorporating the characteristics of the synchronization group. The allocation and change of the group ID are started by a delegate node.

The characteristics that can be incorporated into the group ID can include whether or not the GPS of a synchronization group has been synchronized and the size of the synchronization group. The size of the synchronization group can be known through the number of nodes of the synchronization group or a maximum number of hops.

In order to adjust the synchronization reference time of a synchronization group on the basis of an absolute reference time based on a GPS, the synchronization group must include one or more GPS-enabled nodes. Furthermore, a synchronization group whose frame reference time and frame index have been set by a GPS-enabled node based on an absolute reference time is called a GPS synchronization group.

A group ID of 0xFF(255) is allocated to the delegate node of a GPS synchronization group, and the delegate node does not perform periodic group update. Furthermore, when two GPS synchronization groups are merged, an additional synchronization reference time adjustment procedure is not performed.

A group ID is allocated to the delegate node of a non-GPS synchronization group based on the size of the non-GPS synchronization group. The group ID can be allocated based on a maximum number of hops H in a corresponding group. A maximum number of hops in a group can be obtained based on routing information. A maximum number of hops refers to a maximum value of paths of a minimum number of hops between two nodes in a network in a graph indicating connectivity between the nodes of the group.

In the group, a maximum number of hops H can have a range of 1 to 16. A delegate node can randomly select a group ID in the section of each hop H as in Equation 3.

$$\text{New } MGID = \begin{cases} [16\times(H-1), 16\times H-1], & \text{if } 0 \le H < 16 \\ [16\times(H-1), 16\times H-1), & \text{if } H = 16 \end{cases} \quad \text{(Equation 3)}$$

The size of a group is dynamically changed by the mobility of a node within the group and the merger of groups, but the changed size of the group is incorporated into a next group ID update procedure.

Figure 13:
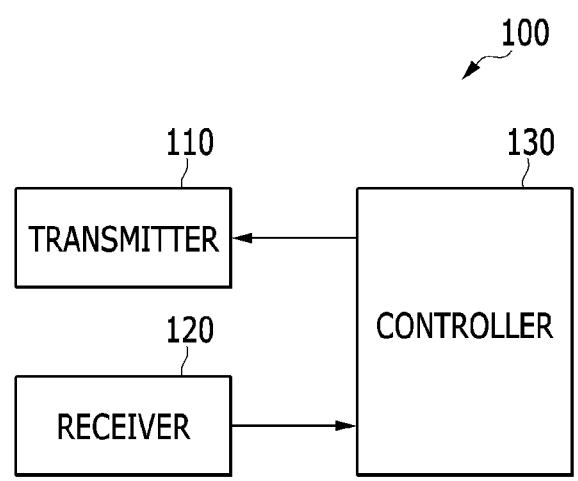
FIG. 13 is a diagram schematically showing a group management apparatus in accordance with an exemplary embodiment of the present invention.

FIG. 13 is a diagram schematically showing a group management apparatus in accordance with an exemplary embodiment of the present invention.

Referring to FIG. 13, the group management apparatus 100 includes a transmitter 110, a receiver 120, and a controller 130. A node in a wireless communication network includes the group management apparatus 100.

The transmitter 110 and the receiver 120 communicate with an adjacent node. The transmitter 110 sends a long-distance beacon signal, an NCFG message, a group configuration update message, and a routing update message. The receiver 120 receives the long-distance beacon signal, the NCFG message, the group configuration update message, and the routing update message.

The controller 130 performs the operations described with reference to FIGS. 4 to 12. That is, if groups having mobility are moved and located in the same area, the controller 130 of each node can recognize a node belonging to a different group and perform an operation of merging the groups into one group. In particular, the controller 130 changes a frame start time, a synchronization reference time, and a group ID for the group merger. Furthermore, the controller 130 may allocate a group ID or periodically change the group ID.

In accordance with an exemplary embodiment of the present invention, one network can be classified into several groups and operated. If groups neighbor one another due to mobility and may interfere with one another, a procedure for adjusting synchronization between the groups and a procedure for merging the groups are performed, and thus the groups can be merged into one group. Furthermore, if one group is physically classified into several groups and operated, the several groups can be recognized as different groups.

As described above, this group merger or separation function is used and the synchronization reference time of a node within a group is adjusted using a small number of groups using a GPS. Accordingly, if groups are merged by adjusting the times of the nodes of the group based on the time based on a GPS, although no nodes include GPSs, all the nodes can operate so that their synchronization reference times are adjusted. Accordingly, interference between adjacent groups can be reduced.

The exemplary embodiments of the present invention are not implemented by way of only the method and/or the apparatus, but may be implemented by way of a program for realizing a function corresponding to a construction according to an exemplary embodiment of the present invention or a recording medium on which the program is recorded. The implementations will be evident to a person having ordinary skill in the art to which the present invention pertains from the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of managing a plurality of groups, included in a wireless communication network, by a synchronization group management apparatus of a node belonging to any of the plurality of groups, comprising:
   scanning an adjacent group different from a group to which the node belongs;
   determining whether the group to which the node belongs is a master group or a slave group regarding a role of the group; and
   performing a group merging process with the adjacent group to merge the group to which the node belongs and the adjacent group into one united group if, as a result of the determination, the group to which the node belongs is determined to be a slave group.

2. The method of claim 1, wherein performing group merging with the adjacent group if, as a result of the determination, the node is determined to be the slave group, comprises:
   changing a synchronization reference time of the slave group into a synchronization reference time of the master group; and
   changing a group identifier (ID) of the slave group into a group ID of the master group.

3. The method of claim 1, wherein scanning an adjacent group different from a group to which the node belongs comprises:
   receiving a control signal from an adjacent node; and
   comparing a group identifier (ID), a frame start time, and a frame index, included in the control signal, with a group ID of the group to which the node belongs and a frame start time and a frame index allocated to the group to which the node belongs, respectively, and determining whether a group to which the adjacent node belongs is the adjacent group based on a result of the comparison.

4. The method of claim 3, wherein
   the control signal is transmitted in a first subframe of a superframe that is a multiple of a predetermined transmission period of the control signal, and
   the receiving a control signal from an adjacent node comprises receiving the control signal in an idle frame having a location changed for each period.

5. The method of claim 3, wherein determining whether the group to which the node belongs is a master group or a slave group regarding a role of the group comprises:
   comparing a group ID value of the adjacent group with a group ID value of the group to which the node belongs and determining a group having a greater value as the master group as a result of the comparison; and
   comparing the frame start time or the frame index, included in the control signal, with the frame start time or the frame index allocated to the group to which the node belongs and determining a group having an earlier value as the master group as a result of the comparison, if, as a result of the comparison, the group ID value of the adjacent group is identical with the group ID value of the group to which the node belongs.

6. A method of managing a plurality of groups, included in a wireless communication network, by a synchronization group management apparatus of a node belonging to any of the plurality of groups, comprising:
   scanning an adjacent group different from a group to which the node belongs;
   determining whether the group to which the node belongs is a master group or a slave group regarding a role of the group; and performing group merging with the adjacent group if, as a result of the determination, the group to which the node belongs is determined to be a slave group, wherein the performing group merging with the adjacent group comprises:

changing a frame start time of the slave group and a frame index of the slave group into a frame start time of the master group and a frame index of the master group, respectively; and changing a group identifier (ID) of the slave group into a group ID of the master group.

7. The method of claim 6, wherein the changing a frame start time of the slave group into a frame start time of the master group comprises:

obtaining the frame start time of the master group;

calculating a pause duration for a frame start time identical with the frame start time of the master group;

generating a group configuration update message in which a time when the frame start time is to be changed and the calculated pause duration are set; and sending the group configuration update message to all nodes within the slave group.

8. The method of claim 6, wherein the changing a frame index of the slave group into a frame index of the master group comprises:

obtaining the frame index of the master group;

generating a group configuration update message in which a time when the frame index is to be changed and the frame index of the master group into which the frame index of the slave group is to be changed are set; and sending the group configuration update message to all nodes within the slave group.

9. The method of claim 6, wherein the changing a group ID of the slave group into a group ID of the master group comprises:

obtaining the group ID of the master group;

generating a group configuration update message in which a time when the group ID is to be changed and the obtained group ID of the master group is set as a group ID into which the group ID of the slave group is to be changed; and sending the group configuration update message to all nodes within the slave group.

10. The method of claim 6, wherein the changing a frame reference time of the slave group into a synchronization reference time of the master group a frame start time of the slave group and a frame index of the slave group comprises:

receiving a group configuration update message from a node within the slave group;

extracting a group configuration change time, pause duration for changing a frame start time, a new frame index, and a new group ID from the received group configuration update message; and changing a group configuration using the pause duration, the new frame index, and the new group ID after the group configuration change time and operating using the changed group configuration.

11. The method of claim 10, wherein the changing a frame start time of the slave group and a frame index of the slave group further comprises determining one of a plurality of group configuration update messages as a valid message if a node within the slave group receives the plurality of group configuration update messages.

12. A method of managing a plurality of groups, included in a wireless communication network, by a synchronization group management apparatus of a node belonging to any of the plurality of groups, comprising:

scanning an adjacent group different from a group to which the node belongs;

determining whether the group to which the node belongs is a master group or a slave group regarding a role of the group;

performing group merging with the adjacent group if, as a result of the determination, the group to which the node belongs is determined to be a slave group; and instructing a node belonging to a non-GPS (non-Global Positioning System) synchronization group on a change of a frame start time, a frame index, and a group identifier (ID) if the node that is a GPS-enabled node enters the non-GPS synchronization group.

13. A method of managing a plurality of groups, included in a wireless communication network, by a synchronization group management apparatus of a node belonging to any of the plurality of groups, comprising:

scanning an adjacent group different from a group to which the node belongs;

determining whether the group to which the node belongs is a master group or a slave group regarding a role of the group;

performing group merging with the adjacent group if, as a result of the determination, the group to which the node belongs is determined to be a slave group;

periodically changing a group identifier (ID) of the group of the node if the group of the node is a non-GPS (non-Global Positioning System) synchronization group; and sending the changed group ID to the non-GPS synchronization group.

14. The method of claim 13, wherein periodically changing a group ID of the group of the node if the group of the node is a non-GPS synchronization group comprises determining a group ID into which the group ID of the group of the node is to be changed based on whether or not the group includes a GPS-enabled node and a size of the group.

15. A synchronization group management apparatus of a node belonging to any of a plurality of groups included in a wireless communication network, comprising:

a receiver for receiving a control signal from an adjacent node; and a controller for determining whether or not a group to which the adjacent node belongs is different from a group to which the node belongs based on the control signal, and changing a frame start time and a synchronization reference time of the group to which the node belongs into a frame start time and a synchronization reference time of the group to which the adjacent node belongs, if the group to which the adjacent node belongs is a master group and the group to which the node belongs is a slave group, to merge the group to which the adjacent node belongs and the group to which the node belongs into one united group.

16. The synchronization group management apparatus of claim 15, wherein the controller obtains the frame start time and the synchronization reference time of the master group through the control signal.

17. The synchronization group management apparatus of claim 15, further comprising a transmitter, wherein the controller generates a group configuration update message in which a frame start time and a frame index into which a frame start time and a frame index of the node are to be changed are set, and the transmitter sends the group configuration update message to a node within the slave group.

18. The synchronization group management apparatus of claim 15, wherein the controller compares a group identifier (ID) value of the adjacent group with a group ID value of the group to which the node belongs, determines a group having a greater value as the master group as a result of the comparison, compares a frame start time or a frame index included in the control signal with a frame start time or a frame index allocated to the group to which the node belongs if, as a result of the comparison, the group ID value of the adjacent group is identical with the group ID value of the group to which the node belongs, and determines a group having a earlier value as the master group as a result of the comparison.

19. A synchronization group management apparatus of a node belonging to any of a plurality of groups included in a wireless communication network, comprising:
   a receiver for receiving a control signal from an adjacent node;
   a controller for
      determining whether or not a group to which the adjacent node belongs is different from a group to which the node belongs based on the control signal,
      changing a frame start time and a synchronization reference time of the group to which the node belongs into a frame start time and a synchronization reference time of the group to which the adjacent node belongs, if the group to which the adjacent node belongs is a master group and the group to which the node belongs is a slave group, and
      periodically changing a group identifier (ID) of the node if the group to which the node belongs is a non-GPS (non-Global Positioning System) synchronization group, and
   a transmitter for transmitting a group configuration update message, comprising the changed group ID, to the non-GPS synchronization group.

20. A synchronization group management apparatus of a node belonging to any of a plurality of groups included in a wireless communication network, comprising:
   a receiver for receiving a group configuration update message from a node within a group identical with the group to which the node belongs, and
   a controller for
      determining whether or not a group to which the adjacent node belongs is different from a group to which the node belongs based on the control signal, and
      changing a frame reference time, a frame index, and a group identifier (ID) of the group to which the node belongs into a frame start time, a frame index, and a group ID of the group to which the adjacent node belongs based on the received group configuration update message, if the group to which the adjacent node belongs is a master group and the group to which the node belongs is a slave group.

* * * * *